(12) United States Patent  
Iwase et al.

(10) Patent No.: US 7,412,148 B2  
(45) Date of Patent: Aug. 12, 2008

(54) OPTICAL MODULE INCLUDING AN OPTICAL COMPONENT AND AN OPTICAL DEVICE

(75) Inventors: Masayuki Iwase, Tokyo (JP); Atsushi Izawa, Tokyo (JP); Yozo Ishikawa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/531,709

(22) PCT Filed: Oct. 17, 2003

(86) PCT No.: PCT/JP03/13305

§ 371 (c)(1),  
(2), (4) Date: Apr. 13, 2006

(87) PCT Pub. No.: WO2004/036280

PCT Pub. Date: Apr. 29, 2004

(65) Prior Publication Data

US 2006/0188211 A1    Aug. 24, 2006

(30) Foreign Application Priority Data

Oct. 17, 2002    (JP)    ............... 2002-302734

(51) Int. Cl.  
*G02B 6/00* (2006.01)  
*G02B 6/36* (2006.01)

(52) U.S. Cl. .................. 385/137; 385/53; 385/88; 385/92

(58) Field of Classification Search ............ 385/53, 385/88, 92, 137  
See application file for complete search history.

(56) References Cited

U.S. PATENT DOCUMENTS 6,406,196 B1 *    6/2002    Uno et al. ............... 385/89  
6,985,666 B2 *    1/2006    Takano ................. 385/137

FOREIGN PATENT DOCUMENTS

| EP | 0 844 503 | 5/1998 |
|---|---|---|
| JP | 63-228102 | 9/1988 |
| JP | 03-027006 | 2/1991 |
| JP | 03-072305 | 3/1991 |
| JP | 04-161908 | 6/1992 |
| JP | 07-104152 | 4/1995 |
| JP | 07-120638 | 5/1995 |
| JP | 2001-066473 | 3/2001 |
| JP | 2002-062459 | 2/2002 |

* cited by examiner

*Primary Examiner*—Frank G Font  
*Assistant Examiner*—Michael P Mooney  
(74) *Attorney, Agent, or Firm*—Oblon, Spivak, McClelland, Maier & Neustadt, P.C.

(57) ABSTRACT

An optical component provided with a waveguide groove having, an waveguide holding plane having a surface shape extending along a specified axial direction and capable of holding at least one optical waveguide while positioning it at at least a part of at least one side face thereof; and an opening extending substantially oppositely to the waveguide holding plane and being smaller in width than the outside diameter of at least one optical waveguide in a specified widthwise direction perpendicular to the specified axial direction.

13 Claims, 16 Drawing Sheets

Fig. 4C

SIZE IN X DIRECTION OF SPOT SIZE CONVERSION DEVICE($\mu$ m)

OPTICAL MODULE INCLUDING AN OPTICAL COMPONENT AND AN OPTICAL DEVICE

BACKGROUND OF THE INVENTION

1. Field of the Invention

The present invention relates to an optical component and an optical module using this component, which are used for optical communications and information processing.

2. Background Art

In the system of an access system, in recent years, a two-way communication system by a single core optical fiber has become a mainstream from among optical communications fields. In this case, a laser of wavelength of 1.49 µm or 1.55 µm is used from a center side to a subscriber, and a wavelength multiplexing transmission system (WDM, wavelength-division multiplexing) using a laser of 1.3 µm is utilized from the subscriber to the center side.

The optical module required for the above described system requires a semiconductor laser generating a laser of wavelength 1.49 µm or 1.55 µm, a light receiving element such as PD and the like receiving a laser of wavelength 1.3 µm, and a WDM filter circuit to separate both wavelengths at the center side. Further, at the subscriber side also, a semiconductor laser generating a laser of wavelength 1.3 µm, a light receiving element such as PD and the like receiving a laser of wavelength 1.49 µm or 1.55 µm, and a WDM filter circuit to separate both wavelengths are required.

For example, in the case of the single-core bidirectional module of a first type, a filter inclined to an optical axis is disposed at a fiber end, and from among the lights from the fiber end, the light of a target wavelength alone is reflected by a filter, and is guided to the light receiving element, while aligning it by a lens. On the other hand, the light from the semiconductor laser can be coupled to the fiber end through the filter, while being aligned by the lens (for example, The Institute of Electronics, Information and Communication Engineers, General Conference Preliminary Report Collection (2000), B-10-168, p543 [Coaxial Integrated Type ONU Optical Module for ATM-PON corresponding to descent 622 Mb/s]; The Institute of Electronics, Information and Communication Engineers, Electronics society General Conference Preliminary Report Collection (1996), C-208, p208 [Receptacle Type Two-Way Wavelength Multiplexing Optical Module 1]).

Further, the single-core bidirectional module of a second type, has a constitution in which an optical waveguide is coupled with the fiber end, and for this optical waveguide, an angle cut groove is processed by a dicing and the like, and a filter inclined to this groove is disposed. Here, from among the lights from the fiber end, the light of the target wavelength alone is reflected by the filter, and is guided to the light receiving element, and the light from the semiconductor laser disposed behind the filter is transmitted through the filter and the optical waveguide so as to be coupled with the fiber end (for example, Japanese Patent Application Laid-Open No. 2000-228555: The institute of Electronics, Information and Communication Engineers, Electronics Society Conference Preliminary Report Collection (1997), C-3-89, p198, [Surface Mounted LD/PD Integrated Module]).

Further, in the case of the single-core bidirectional module of a third type, the fiber end and the semiconductor laser are disposed respectively on a pair of V-character branched fiber ends by using a V-shaped PLC waveguide, and a filter is provided on the end face of the PLC waveguide corresponding to a V-character bottom, and the light receiving element is disposed oppositely to this filer. From among the lights from the fiber end, the light of the target wavelength alone is guided to the light receiving element through the filter by the end face of the PLC waveguide, and the light from the semiconductor laser is reflected by the filter provided on the end face of the PLC waveguide, and is coupled with the fiber end (for example, The Institute of Electronics, Information and Communication Engineers, General Conference Preliminary Report Collection (2000), C-3-132, p3128 [Development of 1.3 µm/1.55 µm-WDM Type PLC Module]; Oguro et al., "1.25 Gb/s WDM Bi Directional Transceiver Module Using with Spot-size Conversion Region", 2002 Electronic Components and Technology Conference; The Institute of Electronics, Information and Communication Engineers, General Conference Preliminary Report Collection (2000), B-10-166, p541 [Preparation of Optical Transmitting and Receiving Module for ATM-PON OUN]; The Institute of Electronics, Information and Communication Engineers, General Conference Preliminary Report Collection (2000), C-3-129, p308 [Research Work on Low Crosstalk of Optical transmitting and Receiving Module for ATM-PON OUN]).

However, the optical module of the first type requires an aligning process to perform disposition adjustment of the lens and like, and skill and accuracy are required for the manufacturing of the optical module, thereby reducing yield ratio.

Further, while the optical module of the second type does not require an alignment of the lens and like since it uses the waveguide, after forming the waveguide, a groove process, and a process of insertion and adhesion of the filter are required, and this makes the manufacturing process of the optical module complicated.

Further, the optical module of the third type also requires a process of adhesion and the like of the filter in addition to the formation of the waveguide, and this makes the manufacturing process of the optical module complicated.

SUMMARY OF THE INVENTION

An object of the present invention is to provide an optical component, which enables a simple manufacture of a highly precise optical module.

Further, the object of the present invention is to provide an optical module, which can be manufactured by a simple operation and has a high accuracy.

The aspect of the optical component of the present invention is provided with a waveguide groove having; a waveguide holding plane having a surface shape extending along a specified axial direction and capable of holding at least one optical waveguide while positioning it at at least a part of at lease one side face thereof; and an opening portion extending substantially oppositely to the waveguide holding plane and being smaller in width than the outside diameter of at lease one optical waveguide in a specified widthwise direction perpendicular to the specified axial direction.

According to such a configuration, in the waveguide groove of the optical component, since it is possible to hold at least one waveguide at at least a part of one side face thereof by the waveguide holding plane having a surface shape extending along a specified axial direction, a simple holding and alignment of the waveguide is made possible only by inserting the optical waveguide along the waveguide holding plane of the waveguide groove.

Further, the opening portion of the waveguide groove extends substantially oppositely to the waveguide holing plane, and has a width smaller than the outside diameter of at lease one optical waveguide in a specified widthwise direction, and therefore, while preventing separation of the waveguide positioned in the waveguide groove, an optical branching coupling function can be easily added in which a light is guided into the optical waveguide positioned in the waveguide groove from the outside of the waveguide groove through the opening portion and a necessary light is taken out from this optical waveguide through the opening portion. Note that, when the optical waveguide is inserted into the waveguide groove, since the waveguide end can be directly observed through the opening portion, the alignment of the optical waveguide end portion becomes relatively simple, thereby enhancing assembly accuracy.

The specific aspect of the optical component of the present invention is characterized in that, in the waveguide groove, the waveguide holding plane has a half-cylindrical shape obtained by extending a circular arc more than 180° larger than a specific angle in a center angle in the specific axial direction perpendicular to the plane of the circular arc, and the opening portion extends between a pair of opposed peripheral end portions in a peripheral direction to the half-cylindrical waveguide holding plane.

According to such configuration, since the sectional shape of the waveguide groove becomes like a character [Ω], the processing of the waveguide groove becomes relatively simple, and the optical waveguide can be aligned with high accuracy and can be held reliably.

Further, the specific aspect of the optical component of the present invention is characterized in that the optical waveguide is provided with a filter having a specific characteristic, and the filter is fixed so as to be positioned by corresponding to the opening portion.

According to such configuration, the optical component can be utilized as an optical passive device such as an optical multiplexing and demultiplexing device and the like. Note that, while this filter can be turned into a band pass filter, a ND filter and the like, it can be also turned into a mirror.

Further, the specific aspect of the optical component of the present invention is characterized in that the filer has a specific angle of inclination to the optical axis of a propagation light propagated through the optical waveguide.

According to such configuration, since the filter has a specific angle of inclination to the specific axial direction, by utilizing the reflection at the end face of the optical waveguide, for example, optical coupling and branching can be simply performed between the opening portion and the outside of the optical waveguide.

Further, the specific aspect of the optical component of the present invention is characterized in that the filter is provided on the end face of the optical waveguide.

According to such configuration, by utilizing the end face of the optical waveguide, a highly precise filter can be simply incorporated.

Further, the specific aspect of the optical component of the present invention is characterized in that the sectional shape of at least a part of the waveguide groove is Ω-shaped.

According to such configuration, the processing of the waveguide groove becomes relatively simple, and the optical waveguide can be aligned with high precision, and can be held reliably.

Further, the specific aspect of the optical component of the present invention is characterized in that pluralities of waveguide grooves are provided.

According to such configuration, only by inserting the optical waveguide into each waveguide groove, each optical waveguide can be simply held and aligned.

The specific aspect of the optical component of the present invention is characterized in that the optical waveguide has at least a part of the side face engaged with the waveguide groove.

According to such configuration, the optical waveguide can be held in a state reliably positioned for the waveguide groove. Note that [engagement] is referred to as a state not limited to the case fixed or adhered by using solder or adhesive agent, but a state in which the movement (along the axial direction or around the axial direction) of the optical waveguide is limited by more than a constant resisting force.

The aspect of the optical module of the present invention is characterized in that the optical component of the above described aspect and the optical device optically coupled with the optical component are provided, and the optical component and the optical device are optically coupled through the opening portion of the optical component.

According to such configuration, since the optical component to configure the optical module comprises the waveguide groove as described above, only by inserting one or two optical waveguides into the waveguide groove of a simple structure and fixing them at a suitable position, the light emitted from the optical device is guided into any of the optical waveguides through the opening portion, and the necessary light is taken out from such optical waveguide through the opening portion, and is allowed to enter the optical device. Note that the optical device can be, for example, configured by a photo sensor, a laser diode, a lens and the like.

The specific aspect of the optical module of the present invention is characterized in that the optical component further comprises alignment means, and the optical component is positioned by the alignment means.

According to such configuration, the optical module using the optical component can be simply prepared at a low cost, while making it highly accurate.

The aspect of the optical module of the present invention is characterized by comprising the optical component of the above described aspect, a light source portion to output a signal light guided by the optical component, and a spot size conversion portion to convert the spot size of the signal light outputted from the light source portion and to couple it by the spot size to match the end portion of at least one optical waveguide of the optical component.

According to such configuration, when the signal light outputted from the light source portion couples with the end portion of the optical waveguide, even in case the spot sizes of both sides are different, since the spot sizes can be converted into appropriate spot sizes by the spot size conversion portion, the coupling loss of the signal light can be reliably reduced by a simple configuration, so that a sufficient output power can be secured.

The specific aspect of the optical module of the present invention is characterized in that the spot size conversion portion is formed by a planer light wave circuit mounted on a substrate.

According to such configuration, the spot size conversion portion may be formed by the planer light wave circuit and mounted on the substrate, and therefore, by using an optical waveguide technology but not using the lens and the like, the conversion of the spot size can be easily performed.

The specific aspect of the optical model of the present invention is characterized in that the substrate where the spot size conversion portion is formed and the substrate where the light source portions formed are configured by separate entities, and can be positioned independently, respectively.

According to such configuration, since the spot size conversion portion is formed on the substrate different from the substrate where the light source portion is formed, the positioning of both portions are performed independently, so that the manufacture of the optical module can be easily performed.

The specific aspect of the optical module of the present invention is characterized in that the substrate where the spot size is formed and the substrate where the light source portion is formed are formed with a V groove, respectively, and the holding member to hold the optical component is formed with a protrusion, and by engaging each of the V grooves with the protrusion, the positioning thereof is made possible.

According to such configuration, the substrate where the light source portion is formed and the substrate where the spot size conversion portion is formed may perform the positioning by engaging the V grooves formed on each substrate with the protrusion, and therefore, the positioning can be simplified.

BRIEF DESCRIPTION OF THE DRAWINGS

FIG. 1 is a view to explain an optical component according to a first embodiment.

FIG. 2 is a view of the optical component shown in FIG. 1, where

FIG. 8 is a view of the optical module of FIG. 7, where

BEST MODE FOR CARRYING OUT THE INVENTION

First Embodiment

Figure 1A:
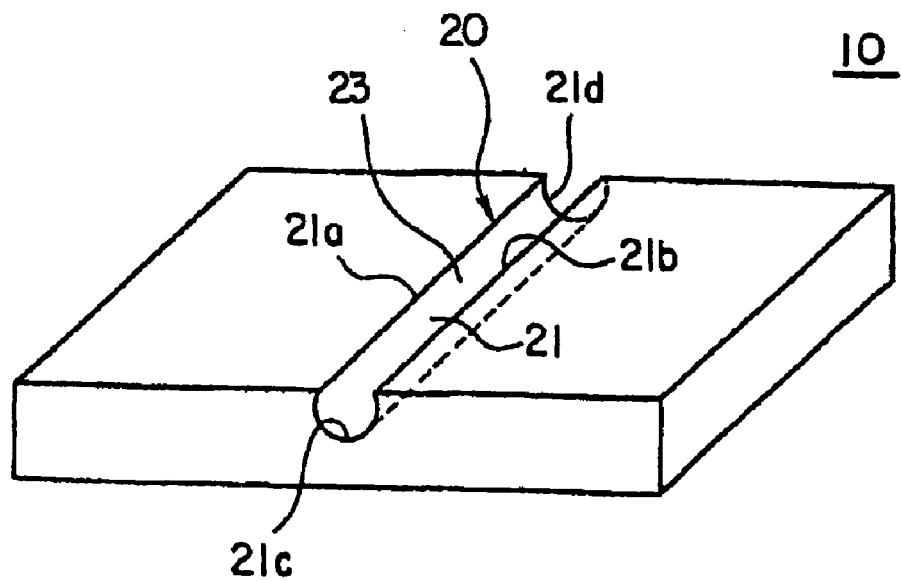
FIG. 1A is an oblique view before assembling.
Figure 1B:
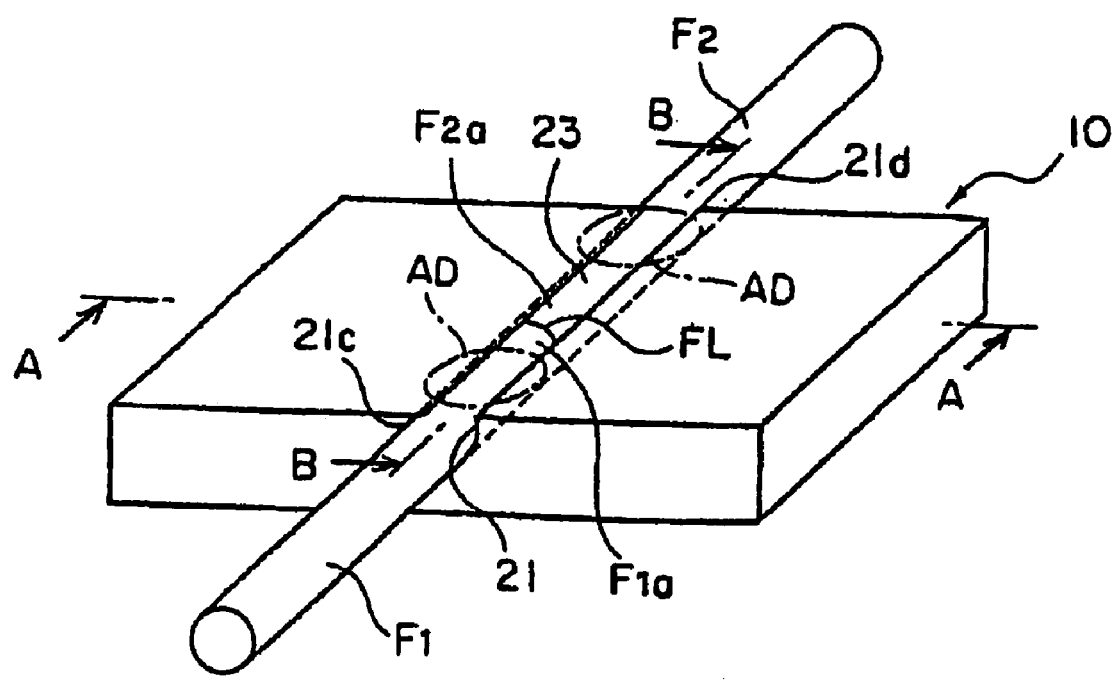
FIG. 1B is an oblique view after assembling.
Figure 2A:
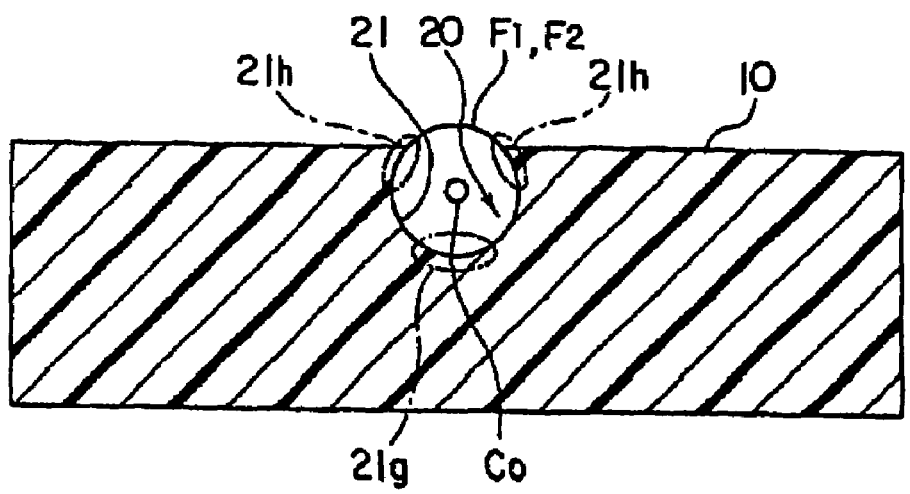
FIG. 2A is a front sectional view of the arrow view A-A.
Figure 2B:
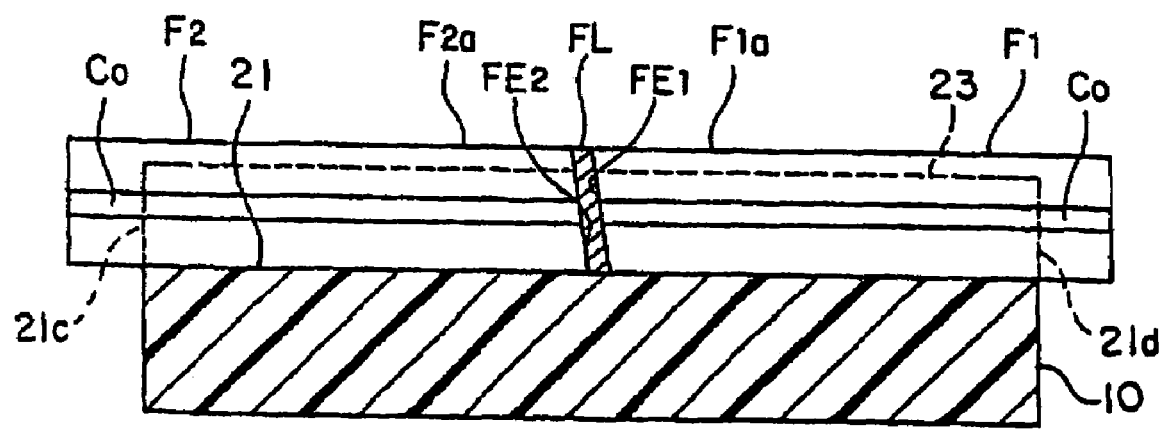
FIG. 2B is side sectional view of the arrow view A-A of the optical component shown in FIG. 1.

FIG. 1 is a view to explain an optical component according to a first embodiment, and FIG. 1A is an oblique view before assembling, and FIG. 1B is an oblique view after assembling. Further, FIG. 2A is a front sectional view of the arrow view A-A of the optical component shown in FIG. 1, and FIG. 2B is a side sectional view of the arrow view A-A of the optical component shown in FIG. 1.

The optical component according to the first embodiment is a fiber built-up hold down member, and is configured to have a fiber groove 20, which is a Ω shaped waveguide groove in sectional shape on the upper center of a platy component main body 10. That is, the fiber groove 20 comprises a fiber holding plane 21, which is a waveguide holding plane having a half-cylindrical shape; and an opening portion 23 extending between a pair of opposed peripheral end portions 21a and 21b of the fiber holding plane 21. Both ends in the axial direction of the fiber holding plane 21 are formed with a pair of axial end portions 21c and 21d allowing the insertion of a pair of optical fibers F1 and F2 which are the optical waveguides.

The component main body 10 is integrally formed by being molded under heating and pressurization of materials such as engineering plastic and the like by utilizing a transfer molding machine and a hot plate press machine.

The pair of optical fibers F1 and F2 to be inserted into both axial end portions 21c and 21d provided in the fiber groove 20 are fixed in the center vicinity of the fiber groove 20 with end portions F1a and F2a pushed against each other. When fixing both optical fibers F1 and F2, various types of bonding agents AD such as epoxy and the like can be used. Here, when allowing both end faces of both optical fibers F1 and F2 to push against each other, since the ends portion F1a and F2a can be directly observed through the opening portion 23, assembly accuracy of the optical component can be enhanced.

Note, though depending on the application, the fixing of both optical fibers F1 and F2 is not necessarily essential. For example, it suffices if the movement of both optical fibers F1 and F2 in the fiber groove 20 is prevented by a constant resisting force.

As shown in the front section of FIG. 2A, the fiber holding plane 21 of the fiber groove 20 comprises a supporting portion 21g of the groove bottom side and a pair of engaging portions 21h of the groove upper side. Here, the support portion 21g supports the end portions F1a and F2a of the both optical fibers F1 and F2 from the lower part of the side face. Further, a pair of engaging portions 21h engage with the end portions F1a and F2a of both optical fibers F1 and F2 at two places of the upper sides of the side faces thereof. In this manner, both optical fibers F1 and F2 are held in the fiber groove 20 in an aligned state. Between both engaging portions 21h, there exists the opening portion 23, and the upper side faces of the end portions F1a and F2a of both optical fibers F1 and F2 are exposed.

As shown in the lateral section of FIG. 2B, between both optical fibers F1 and F2, there is inserted a filter FL. This filter FL is a dielectric multilayer film deposited in the end portion F1a of the optical fiber F1 side, for example, by utilizing film deposition equipment such as an vacuum evaporator and the like, and functions as a cut filter to shield the light of the wavelengths longer and shorter than a specific wavelength and a band pass filter and the like to transmit a specific wavelength only. For example, in case the filter FL is a band pass filter, from among the lights reaching the filter F1 propagated by a core CO of the optical fiber F1, the light alone of a desired wavelength passes through the filter FL, and the remaining lights are all reflected.

The light of a specific wavelength having transmitted the filter FL goes straight as it is, and is coupled with the fiber F2 through the end face FE2, and is propagated as it is by the core CO of the fiber F2. On the other hand, the light reflected by the filter FL, since the end faces FE1 and FE2 of both optical fibers F1 and F2 are processed so as to incline approximately 8° to the optical axis of the propagation light, is emitted outside of the core CO, and is preventing from becoming a return light.

Note that the filter FL is not absolutely necessary. In case the optical component shown in FIG. 1A is used simply as a mechanical splice coupling part, the filter F1 is not provided in the end faces of both optical fibers F1 and F2. Further, by using a ND filter, a half mirror, and the like having no wavelength characteristic as the filter FL, the device as shown in FIGS. 1 and 2 can be used also as a power tap.

Figure 3A:
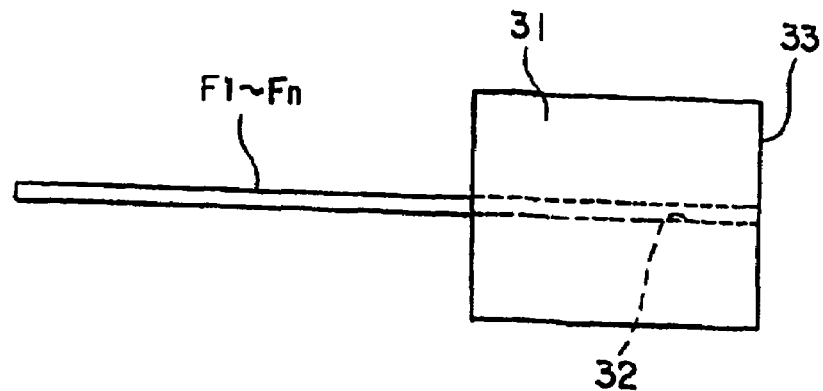
FIG. 3 is a view to explain a processing method of the end face of an optical fiber.
Figure 3B:
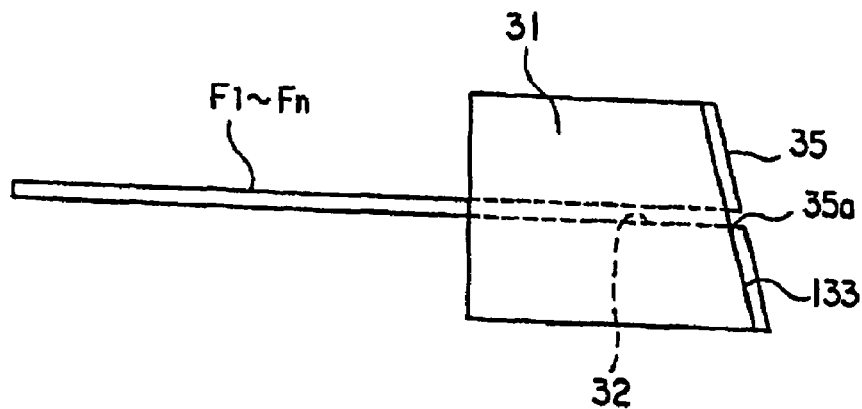
Figure 3C:
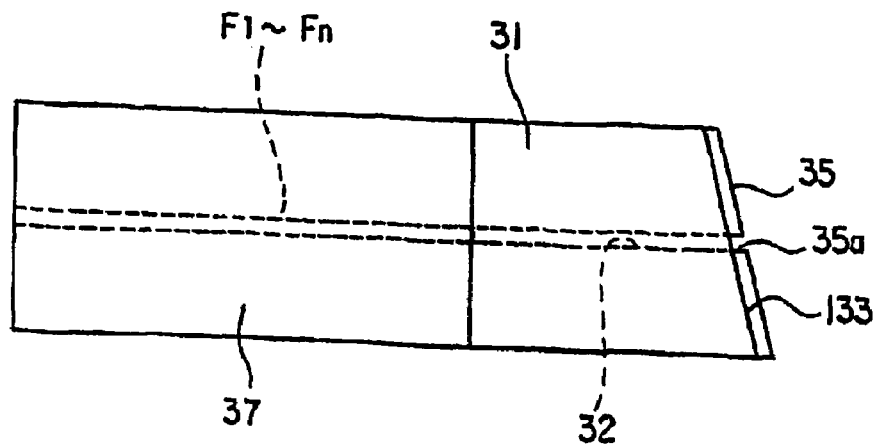

FIG. 3 is a view to explain the processing method of the end face FE2 of the optical fiber F2 shown in FIG. 1. First, as shown in the side face view of FIG. 3A, a multi-core MT ferrule 31 is prepared, and the optical fibers F1 to Fn are inserted into holes 32 formed in a array pattern in this ferrule, and the fiber ends are exposed onto the end face 33, and these optical fibers F1 to Fn are fixed by wax.

Note that, though not clear in the drawing, the holding holes 32 and the optical fibers F1 to Fn provided in the MT ferule 31 are arranged in the direction perpendicular to the sheet face.

Next, together with the MT ferrule 31, the optical fibers F1 to Fn are polished, and the end face 33 is inclined, for example, by 30°. After that, the optical fibers F1 to Fn are separated from the MT ferrule 31, and the MT ferule 31 and the optical fibers F1 to Fn are cleansed.

Next, each hole 32 of the MT ferule 31 is set again with the optical fibers F1 to Fn, and the fiber ends are exposed and fixed on the end face 33. Further, a stencil mask 35 is attached so as to cover the inclined end face 133 of the MT ferrule 31 (see FIG. 3*b*). The stencil mask 35 is formed with an opening 35 corresponding to each hole 32 exposed on the end face 33. Further, by utilizing a fiber holder 37, a mask is applied so as to protect coverings of the optical fibers F1 to Fn at the rear side of the MT ferrule 31, and the top end of the fiber holder 37 is fixed to the root side of the MT ferrule 31 (see FIG. 3C).

After that, by vapor deposition equipment, the dielectric multilayer film comprising an appropriate material is deposited on the end face 133 of the MT ferrule 31, that is, on the stencil mask 35 side. In this manner, the end face only of each of the optical fibers F1 to Fn can be formed with a filter comprising the dielectric multilayer film. After the vapor deposition of the filter, the stencil mask 35 and the fiber holder 37 are taken out, and each of the optical fibers F1 to Fn is separated from the MT ferrule 31. In this manner, in one vapor deposition process, each end face of a number of optical fibers F1 to Fn can be formed with the filter of the same characteristic.

Figure 4A:
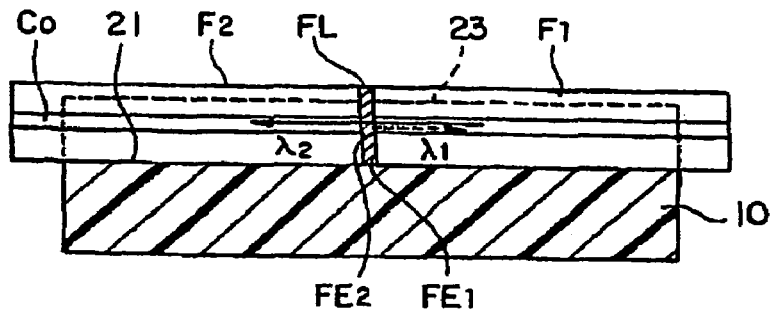
FIG. 4 is a view to explain a modified example of a fiber assembly fixing member shown in FIGS. 1 and 2.

FIG. 4 is a view to explain a modified example of the optical component shown in FIGS. 1 and 2. FIG. 4A shows an example in which the disposition of the filter FL shown in FIG. 2B and the like is changed, and for example, is functioned as a termination cable and the like for optical surveillance monitor wavelength reflection. In this case, the filter FL has an inclination of approximately 2° for the optical axes of both optical fibers F1 and F2. That is, the end faces FE1 and FE2 of the optical fibers F1 and F2 are processed so as to incline approximately 2°, and for example, the light of a wavelength λ1 reflected by the filter FL is returned in the direction to which it has been propagated. On the other hand, for example, the light of a wavelength λ1 having transmitted the filter FL goes straight as it is, and is coupled with the optical fiber F2.

Figure 4B:
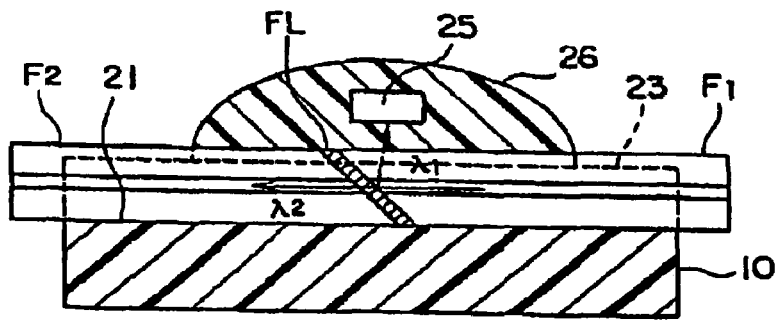

FIG. 4B is a lateral sectional view of a second modified example having further changed the optical component of FIG. 4A. In this case, a photo diode 25 which is an optical device is disposed oppositely to the filter FL, the light of the wavelength λ1 reflected by the filter FL enters the photo diode 25 through the opening portion 23. This photo diode 25 is fixed in an aligned state for the filter FL and the opening portion 23 by a fixing member 26 comprising a permeable resin bonding agent and the like.

FIG. 4C is a lateral section view of a third modified example relating to the optical component shown in FIGS. 1 and 2. In this case, the component main body 110 becomes thick, and is formed with a pit 28 to expose a fiber joining area in the center. The bottom 28a of the pit 28 is flat, and a fiber groove 120 is formed so as to traverse a center of the bottom 28a.

This fiber groove 120 has a fiber holding plane similarly to the case of FIG. 2A, and is Ω-shaped in sectional shape, and has an opening portion 123 extending in the axial direction on the upper portion. This opening portion 123 is exposed with end portions of a pair of optical fibers F1 and F2 inserted from a pair of holes 29a and 29b. In this case also, by utilizing the opening portion 123, the pushing state such as adhering state of both fibers when both optical fibers F1 and F2 are connected can be directly observed, and therefore, assembly accuracy of the optical component can be simply enhanced.

Note that, on occasion of fixing both optical fibers F1 and F2, when both optical fibers F1 and F2 are inserted into both holes 29a and 29b, the side faces of both optical fibers F1 and F2 are adhered with the bonding agent and reciprocated, thereby making a reliable fixing possible.

Figure 4D:
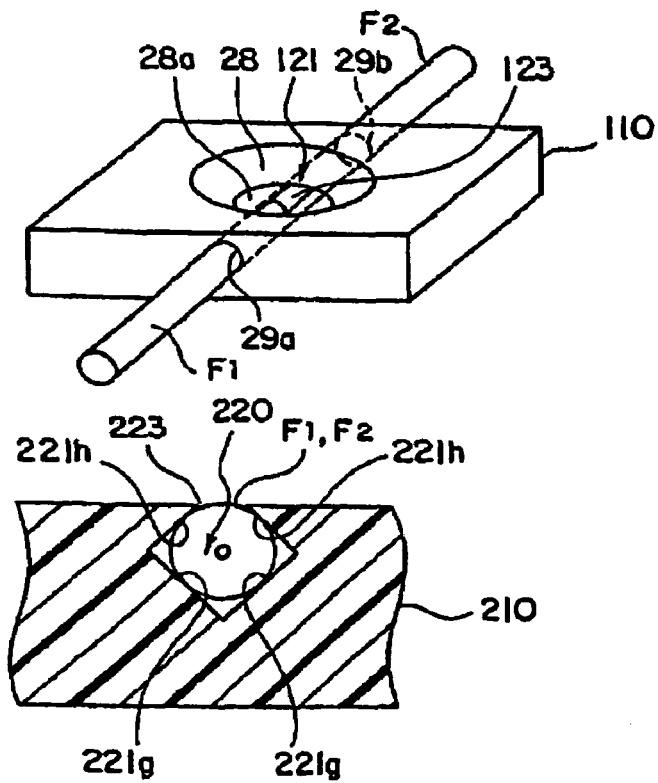

FIG. 4D is a partial front sectional view of a fourth modified example having changed the optical component shown in FIGS. 1 and 2. In this case, the fiber groove 220 has a pentagonal section with one square apex cut out. The inner face of the fiber groove 220 comprises a pair of support faces 221g which are one example of the fiber holding plane and a pair of engaging faces 21h. Here, a pair of support faces 221g supports both optical fibers F1 and F2 by the lower sides of the side faces. Further, a pair of engaging portions 21h engage with both optical fibers F1 and F2 at two places of the upper side of the side faces thereof. In this manner, both optical fibers F1 and F2 are held in the fiber groove 220 in a mutually aligned state. The space between both engaging faces 221h becomes the opening portion 223, and the upper side faces of both optical fibers F1 and F2 are exposed.

Second Embodiment

Figure 5:
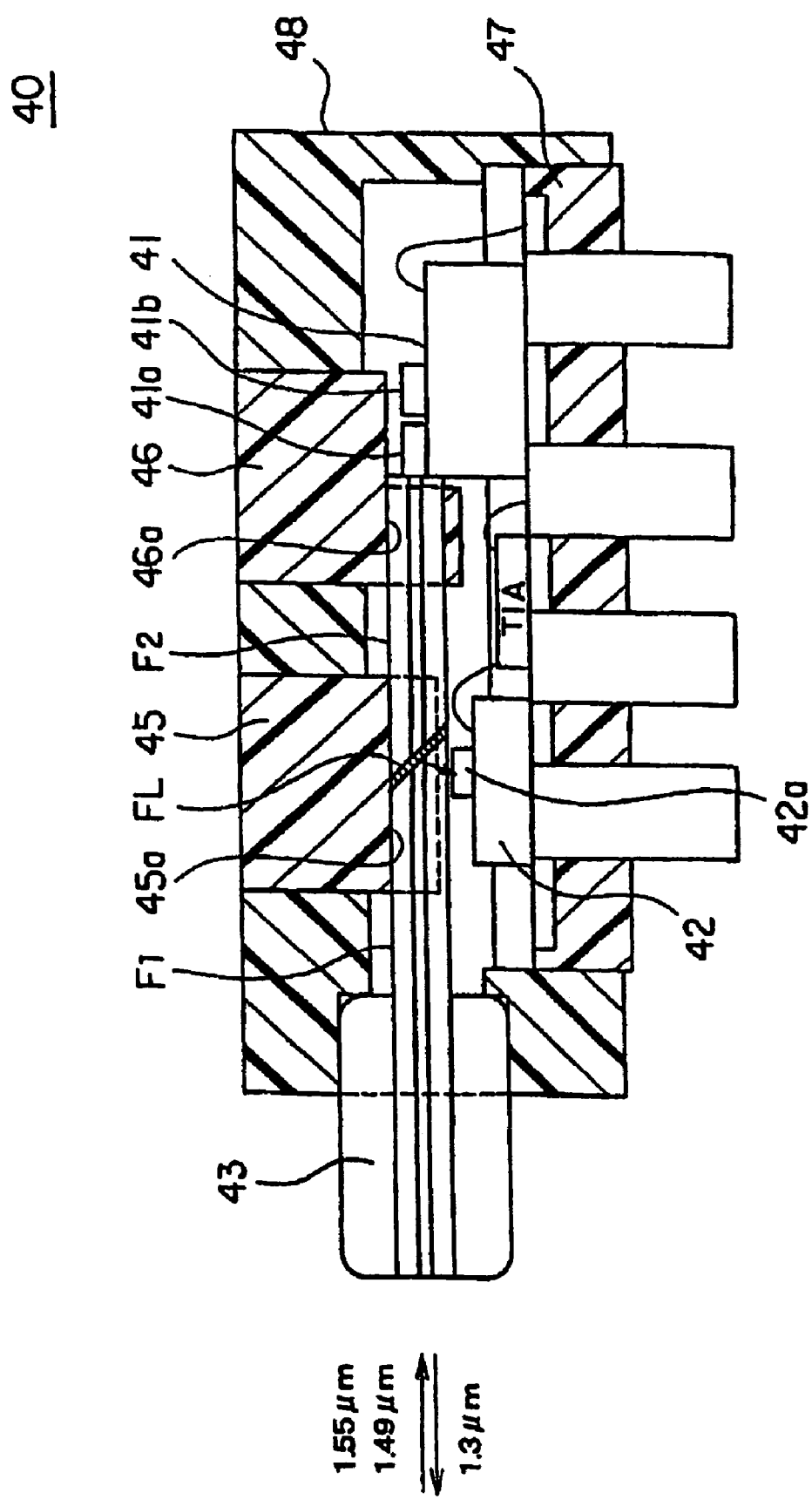
FIG. 5 is a side sectional view to explain a configuration of a single-core bidirectional optical module according to a second embodiment.

FIG. 5 is a lateral sectional view to explain the configuration of a single core bidirectional optical module according to a second embodiment. This optical module 40 is manufactured by using an optical component having the same configuration as the fiber built-up hold down member shown in FIGS. 1 and 2.

As evident from FIG. 5 also, the optical module 40 comprises a laser light source portion 41 generating a signal light of a wavelength 1.3 μm, an optical detector portion 42 receiving a signal light of a wavelength 1.49 μm, a first holding member 45 holding a first optical fiber F1 extending from a ferule 43 and holding a WDM filter to separate both wavelengths 1.3 μm and 1.49 μm, and a shorter second holding member 46 aligning a shorter second optical fiber F2 extending from the first holding member 45 to a laser light source portion 41.

The laser light source portion 41 mounts a semiconductor laser device 41a and a monitor photodiode device 41b on a Si substrate, and is connected by waveguide, and provides a light signal of a wavelength 1.3 μm having a desired waveform to the end portion of the second optical fiber F2 fixed to the second holding member 46.

An optical detection portion 42 mounts a signal detection photo diode device 42a on the Si substrate, and receives a signal light of a wavelength 1.49 μm reflected by a WDM type filter FL formed on the end face of the first optical fiber F1 fixed to the first holding member 45.

The first holding member 45, similarly to the fiber built-up hold down member shown in FIG. 1, has a fiber groove 45a which is Ω-shaped in sectional shape. On the other hand, the second holding member 46, similarly to a general ferrule, has a fiber groove 46a which is circular in sectional shape. Both the holding members 45 and 46 are used to align the optical fibers F1 and F2 and the optical devices 41a and 42a, and is functioned as a sort of ferrule.

Note that the laser light source portion 41 and the optical detection portion 42 are fixed on a substrate 47 molded with a lead frame, together with chip components such as an electric amplifier IC (TIA: Trans-impedance amplifier), a condenser, and the like. The laser light source portion 41 and the optical detection portion 42 on the substrate 47 are inserted into a package 48 which fixes the ferrule 43 and the like, and are sealed in a state nipped by the package 48 and the substrate 47. Note that, though the first and second holding members 45 and 46 to fix a pair of optical fibers F1 and F2 in a positioned state are formed as separate entities, these members can be also molded in a state integrated with the package 8 by transfer molding and hot plate press. In this manner, by integrally making the first and second holding members 45 and 46 into the package 48 in advance, the assembly process of the optical module can be simplified.

Figure 6:
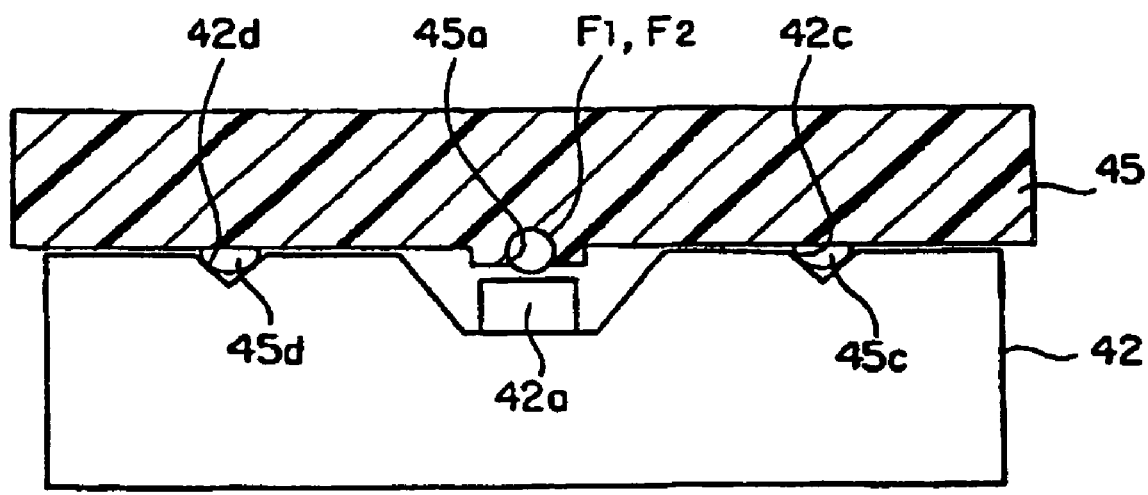
FIG. 6 is a front view to explain an alignment with an optical detector and a fiber holding member.

FIG. 6 is a front view to explain the alignment of the optical detection portion 42 to the first holding member 45. The optical detection portion 42 is formed by the Si substrate, and can simply form V grooves 42c and 42d having an accurate depth. Hence, if protrusions 45c and 45d, which are fitted into V grooves 42c and 42d, are formed in the first holding member 45 in advance, only by pressing the first holding member 45 onto the optical detection portion 42 by a constant pressure, both protrusions can be accurately positioned. Further, the laser light source portion 41 and the second holding member 46 are also aligned similarly to the optical detection portion 42 and the first holding member 45.

Note that, in case the first and second holding members 45 and 46 are integrally built into the package 48, by pressing the substrate 47 mounted with the laser light source portion 41 and the optical detection portion 42 onto the package 48, the optical detection portion 42 and the laser light source portion 41 can be aligned to the first and second holding members 45 and 46, respectively.

Referring back to FIG. 5, the operation of the optical module 40 will be described. The signal light of a wavelength 1.3 μm, which is emitted from the end face of the semiconductor laser device 41a formed in the laser light source portion 41, enters one end of the second optical fiber F2, and transmits a filter FL, and propagates through the first optical fiber F1, and is coupled with an optical fiber (not shown) held by another ferule provided outside. Further, the signal light of a wavelength 1.49 μm introduced from the outside passes through the first optical fiber F1, and is reflected by the filter FL, and enters the photo diode device 42a provided in the optical detection portion 42. Note that, in this case, while the signal light of the wavelength 1.49 μm is to be detected by the optical detection portion 42, due to the change of the filter FL and the like, the signal light of a wavelength 1.55 μm or both signal lights of wavelengths 1.49 μm and 1.55 μm can be also detected.

An assembly of the optical module 40 shown in FIG. 5 will be described below simply. First, by fixing the chip components other than the laser light source portion 41 and the optical detection portion 42 on the lead frame, a substrate 47, which is an electrical package, is assembled. By fixing the laser light source portion 41 and the optical detection portion 42 on the substrate 47, necessary electrical connection is performed by a gold wire and the like.

On the other hand, the first and second holding members 45 and 46 are assembled into the package 48 by using resin and bonding agent. Next, the first optical fiber F1, which forms the filter FL on the top end extending from the ferrule 43 and provided with an appropriate inclined angle, is inserted from one end of the first holding member 45 provided in the package 48. The second optical fiber F2 provided with an inclined angle corresponding to the inclined angle of the end face of the first optical fiber F1 is inserted from the other end of the first holding member 45 through the second holding member 46, and both optical fibers F1 and F2 are fixed to the first holding member 45 and the like. At this time, the filter FL provided between the first and second optical fibers F1 and F2 is positioned so as to be disposed at an appropriate place of the first holding member 45. Further, the ferrule 43 is also fixed to the package 48.

After that, the substrate 47 is fitted into the package 48, and the V groove formed in the laser light source portion 41 and the optical detection portion 42 on the substrate 47 is engaged with the protrusions formed in the first and second holding members 45 and 46 on the package 48, and they are mutually positioned. On the occasion of such positioning, by using silicon resin and epoxy resin, the package 48 and the substrate 47 are adhered and sealed, thereby completing the optical module main body.

Finally, by attaching a receptacle component (not shown) corresponding to the application of CL, MY, SC and the like, it becomes an optical module connectable with a connector.

Third Embodiment

Figure 7:
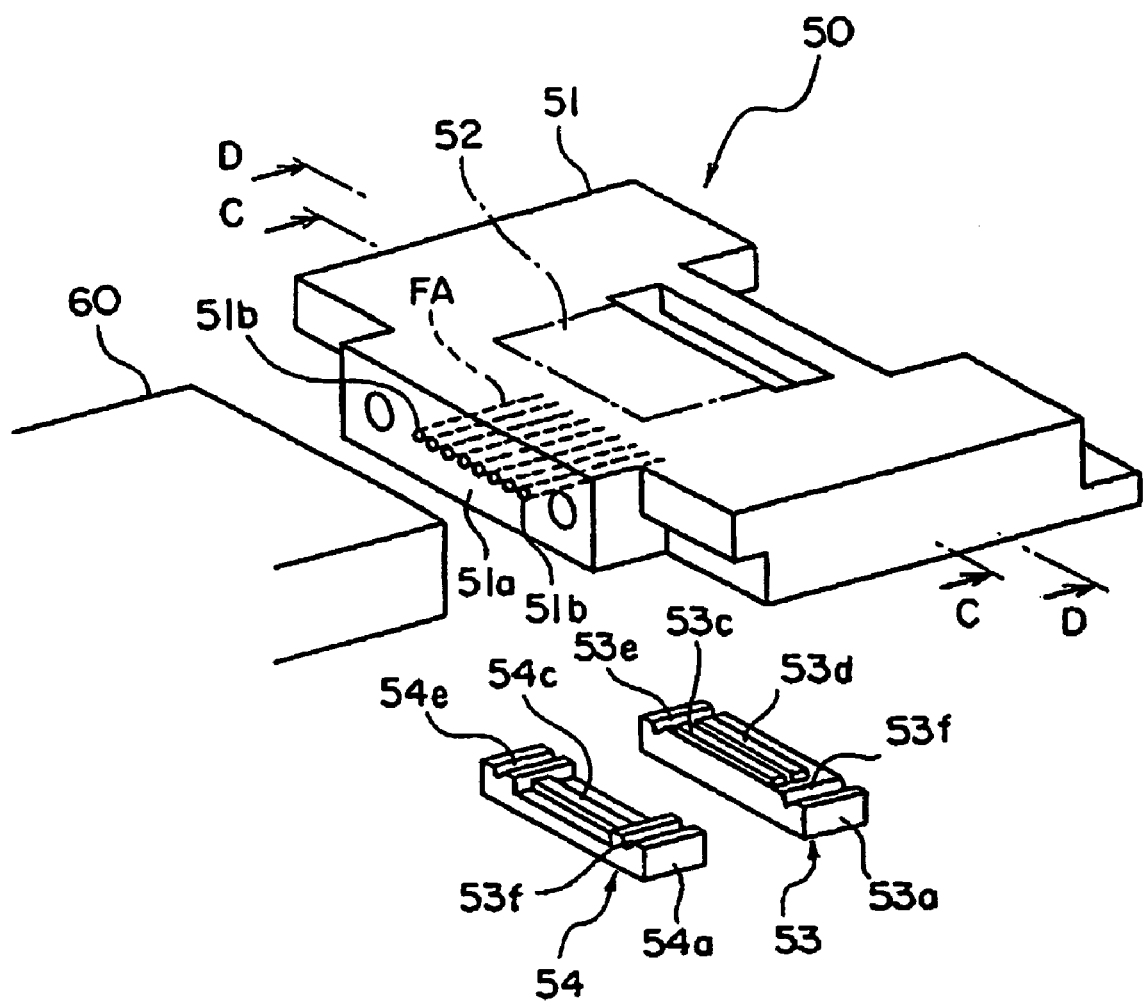
FIG. 7 is an oblique view to explain a configuration of a single-core bidirectional optical module according to a third embodiment.

FIG. 7 is an oblique view to explain the configuration of a single core bidirectional optical module according to a third embodiment. This optical module 50 has turned the optical module shown in FIG. 6 into a module having a plurality of channels.

The optical module 50 shown in FIG. 7 comprises a ferrule 51, an array type holding member 52, an array type emitting portion 53, and an array type light receiving portion 54, and is mechanically connected to an ferrule 60 provided separately, so that an optical coupling is achieved with this ferule 60 per unit of an array-shaped fiber FA. Note that, in the optical module 50, though an array type holding member 52 is conceptually different from the ferrule 51, it can be integrally molded with the ferrule 51 by transfer molding and hot plate press.

The array type holding member 52 collectively aligns the array type emitting portion 53 and the array type light receiving portion 54 to the array-shaped fiber FA fitted into the ferrule 51, and accumulates the first and second holding members 45 and 46 shown in FIG. 5 so as to be turned into the array type.

The array type emitting portion 53 forms a transmission LD array 53c and a monitor PD array 53d on a Si substrate 53a. Further, both ends of the Si substrate 53a are formed with alignment V grooves 53e and 53f. Note that the transmission LD arrays 53c and the like are lined up at the same intervals by the same number as the array-shaped optical fibers FA fitted into the ferrule 51.

The array type light receiving portion 54 forms a receiving PD array 54c on the Si substrate 54a. Further, both ends of the Si substrate 54a are formed with alignment V grooves 54e and 54f. Note that the receiving PD arrays 54c are also lined up at the same intervals by the same number as the array-shaped optical fibers FA.

Figure 8A:
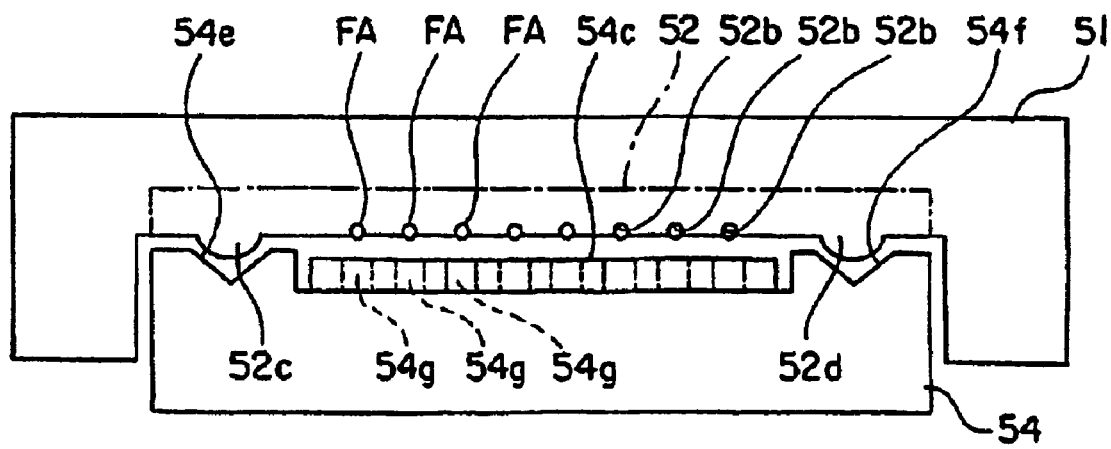
FIG. 8A is a sectional view of the arrow view C-C.
Figure 8B:
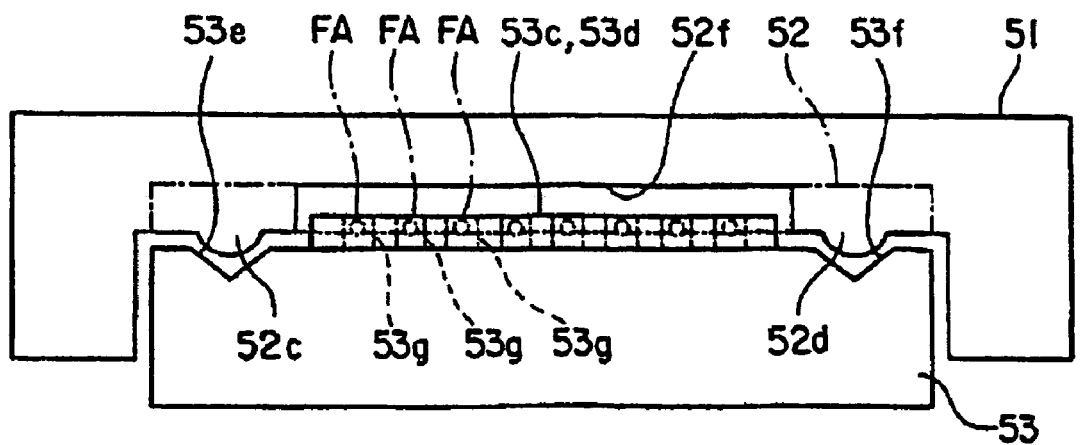
FIG. 8B is a sectional view of the arrow view D-D of the optical module.

FIG. 8A is a sectional view of the arrow view C-C of the optical module 50 shown in FIG. 7, and FIG. 8B is a sectional view of the arrow view D-D of the optical module 50.

As shown in FIG. 8A, in the arrow sectional view C-C, at the bottom of the array type holding member 52, there are formed a plurality of fiber grooves 52b which are Ω-shaped in section and extending in a direction perpendicular to the sheet surface at equal intervals in parallel. Each fiber groove 52b is inserted by and aligned with the optical fiber FA, and is fixed in a lined up state in an array-shape. Both the left and right ends of the array type holding member 52 are formed with a pair of protrusions 52c and 52d for alignment, and can engage with V grooves 54e and 54f for alignment formed in the array type light receiving portion 54. Each optical fiber FA held in the fiber groove 52b is equivalent to the combination of the first and second optical fibers F1 and F2 shown in FIG. 5. That is, the connecting face of a pair of fiber portions configuring each optical fiber FA is provided with a wavelength split filter, and at a position opposing to each filter, there is disposed each photo diode 54g configuring a reception PD array 54c on one for one relation.

As shown in FIG. 8B, in the arrow sectional view D-D, the array type holding member 52 is hollowed out in the ferrule 51 side and becomes a concavity 52f. This concavity 52f is fitted with the transmitting LD array 53c and the monitor PD array 53d mounted on the array type emitting portion 53. At this time, the protrusions 52c and 52d formed in the array type holding member 52 engage with the alignment V grooves 53e and 53f formed in the array type emitting portion 53. The end face of each optical fiber FA exposed on the end face of the concavity 52f side (the rear side of the sheet surface) of the array type holding member 52 is guided by the fiber V groove 52b extending in the direction perpendicular to the sheet surface and fixed, and is disposed for each laser diode 53g configuring the transmission LD array 53c on one by one relation.

Note that, though illustration is omitted, the optical module 50 is fitted also with a cooling electrical circuit substrate mounted with chip components such as TIA and the like in addition to the array type holding member 52 and the array type emitting portion 53 and cooled by Peltier device and the like.

The assembly of the optical module 50 shown in FIG. 7 and the like will be described below. First, a long portion of any one of the optical fibers FA is inserted into the interior from a fiber feed port 51b provided in the end face 41a of the ferrule 51, and is inserted into the fiber groove 52b provided in the array type holding member 52, and is appropriately disposed. Note that the end face of the long portion of the optical fiber FA is provided with the same inclined angle, and is formed with a filter comprising a dielectric multilayer film. Next, a short portion of the array shaped optical fiber FA is inserted from another end (concavity 52f) side of the fiber groove 52b provided in the array type holding member 52, and is pushed against the end face of the long portion so as to be appropriately aligned. After that, the short portion and the long portion are fixed to the fiber groove 52b by using bonding agent and the like.

The above-described process is repeated for each array-shaped optical fiber, and all the optical fibers FA are accurately aligned to the array type holding member 52 and fixed. After that, the array type emitting portion 53 and the array type light receiving portion 54 are aligned to the array type holding member 52, and are fixed to the ferrule 51. Next, the end face 41a of the ferrule 51 is polished, and the rear end face of the long portion is mirror-finished. Finally, the cooling electrical circuit substrate and other parts are fixed to the ferrule 51, and the ferrule 51 is sealed by silicon resin and epoxy resin, thereby completing the optical module 50.

Fourth Embodiment

Figure 9:
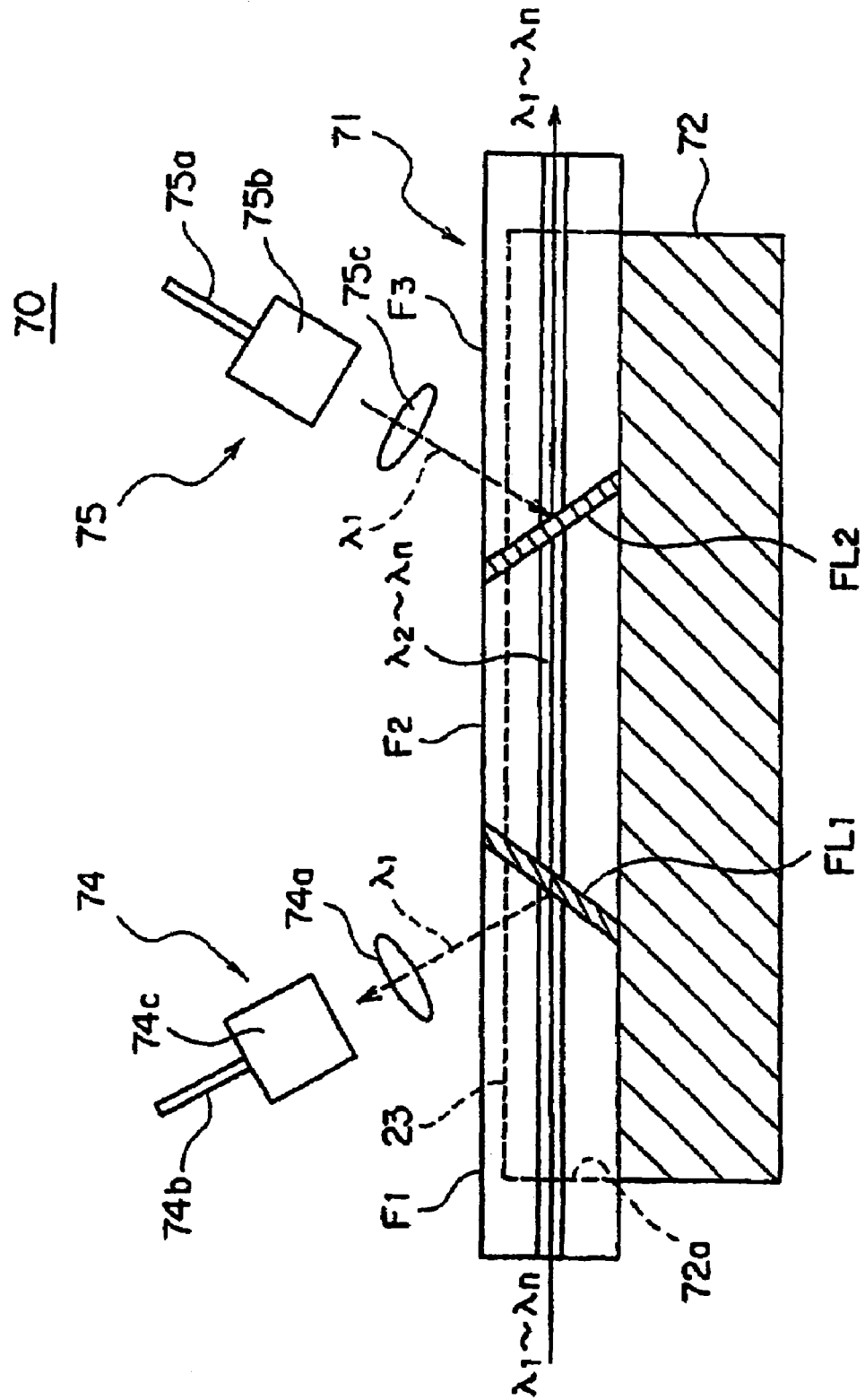
FIG. 9 is a side view to explain a configuration of an optical module according to a fourth embodiment.

FIG. 9 is a side view to explain the configuration of an optical module according to a fourth embodiment. This optical module 70 modifies and incorporates a fiber built-up hold down member according to the first embodiment and functions as an OADM (optical add/drop multiplexer).

A main body portion 71 of the optical module 70 comprises a fiber built-up hold down member 72 and three optical fibers F1, F2, and F3. Each of the optical fibers F1, F2, and F3 is inserted into a fiber groove 72a, which is Ω-shaped in section and provided in the fiber built-up hold down member 72, and is fixed by bonding agent. The end face of the first optical fiber F1 is formed with a first filter FL, and reflects the signal light of a wavelength $\lambda 1$. Further, the end face of the third optical fiber F3 is formed with a second filter FL2, and reflects the signal light of a wavelength $\lambda 1$.

The position of the first filter FL1 is provided with an emission port 74 to take out a reflecting light from the first filter FL1 through an opening portion 23. Further, the position of the second filter F12 is provided with an incident port 75 to allow the signal light to enter the second filter FL2 through the opening portion 23. The emission port 74 comprises a lens 74a to gather the signal light reflected by the first filter FL1 and a ferrule 74c holding the end face of an optical fiber 74b at a light gathering point by the lens 74a. Further, the incident port 75 comprises a ferrule 75b holding an optical fiber 75a and a lens 75c to gather the signal light emitted from the end face of the optical fiber 75a at the center of the second filter FL2.

The operation of this optical module 50 will be described. When the signal lights of wavelengths $\lambda 1$ to $\lambda n$ are allowed to enter from the fist optical fiber F1 side, when passing through the first filter FL1, the signal light of the wavelength $\lambda 1$ is reflected, and after having passed through the opening portion 23, enters the emission port 74, and is branched into an optical fiber 74b. In this manner, signal lights of wavelengths $\lambda 2$ to $\lambda n$ propagates through the second optical fiber F2. Further, when the signal light enters the third optical fiber F3 from the second optical fiber F2, the signal light of the wavelength $\lambda 1$ entering from the incident port 75 is reflected and multiplexed by the second filer FL2, and the signal lights of the wavelengths $\lambda 1$ to $\lambda n$ propagate through the third optical fiber F3.

Fifth Embodiment

Figure 10:
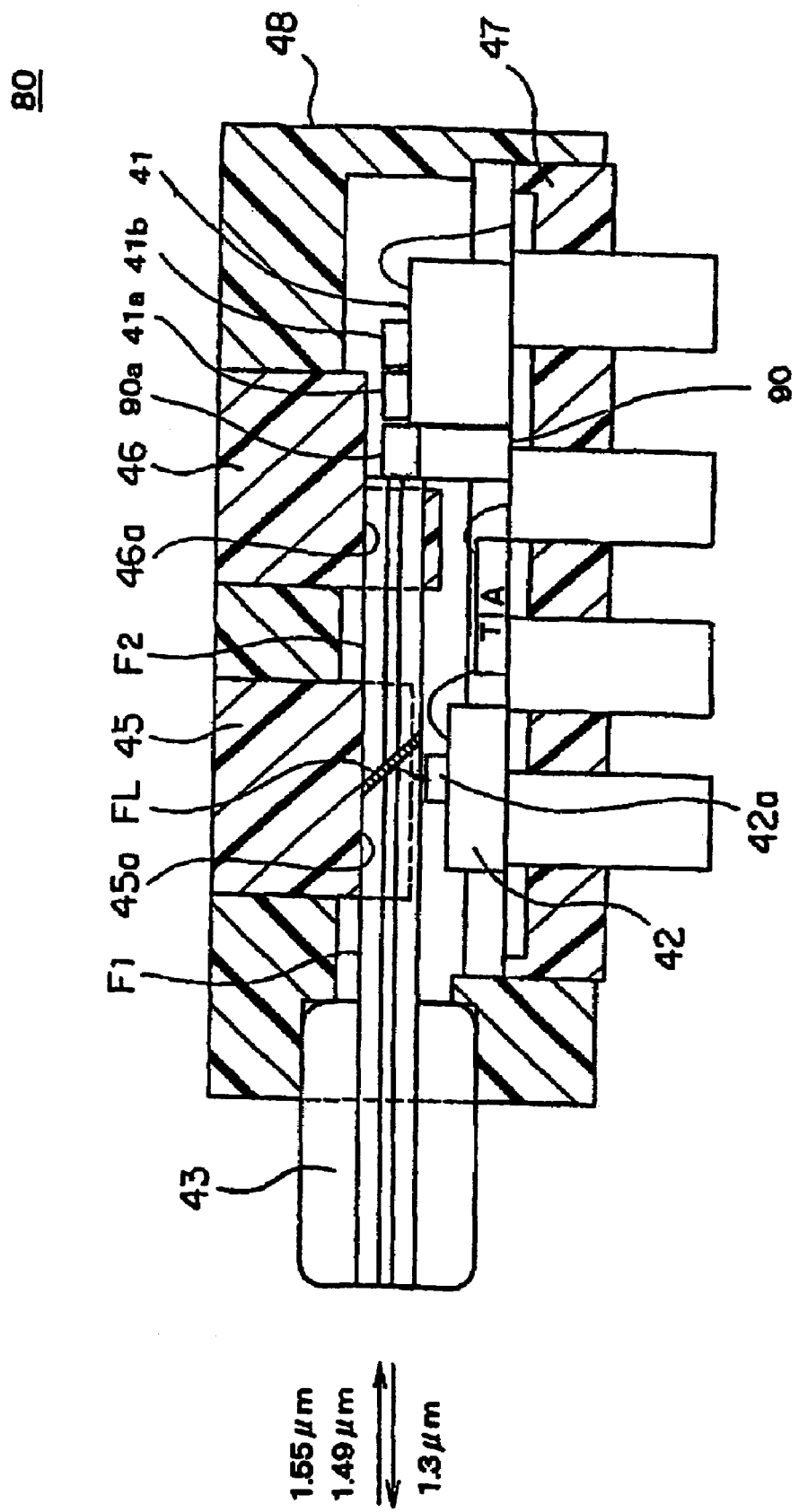
FIG. 10 is a lateral sectional view to explain a configuration of an optical module according to a fifth embodiment.

FIG. 10 is a lateral sectional view to explain the configuration of an optical module according to a fifth embodiment. This optical module 80, while based on the configuration of the optical module shown in FIG. 5, incorporates a spot size conversion portion 90 to convert a spot size when a signal light is supplied to an optical fiber from a light source portion.

As shown in FIG. 10, though the optical module 80 comprises a laser light source portion 41, an optical detection portion 42, a first holding member 45, and a second holding member 46, the basic configuration and operation of each of these component parts are in common with the case of FIG. 5, and therefore, the description thereof will be omitted. In the fifth embodiment, the different point from the case of FIG. 5 is that, in FIG. 10, a spot size conversion portion 90 is provided in the vicinity of a laser light source portion 41.

In the laser light source 41, a semiconductor laser device 41a and a monitor photo diode device 41b are mounted on a Si substrate, and the spot size conversion portion 90 is disposed adjacent to the laser light source portion 41b. This spot size conversion portion 90 mounts a spot size conversion device 90a on the Si substrate. The spot size conversion device 90a receives the signal light of a wavelength 1.3 μm outputted from the laser light source portion 41b, and converts and emits its spot size, and supplies it to the end face of the second optical fiber F2 fixed to the second holding member 46.

Figure 11:
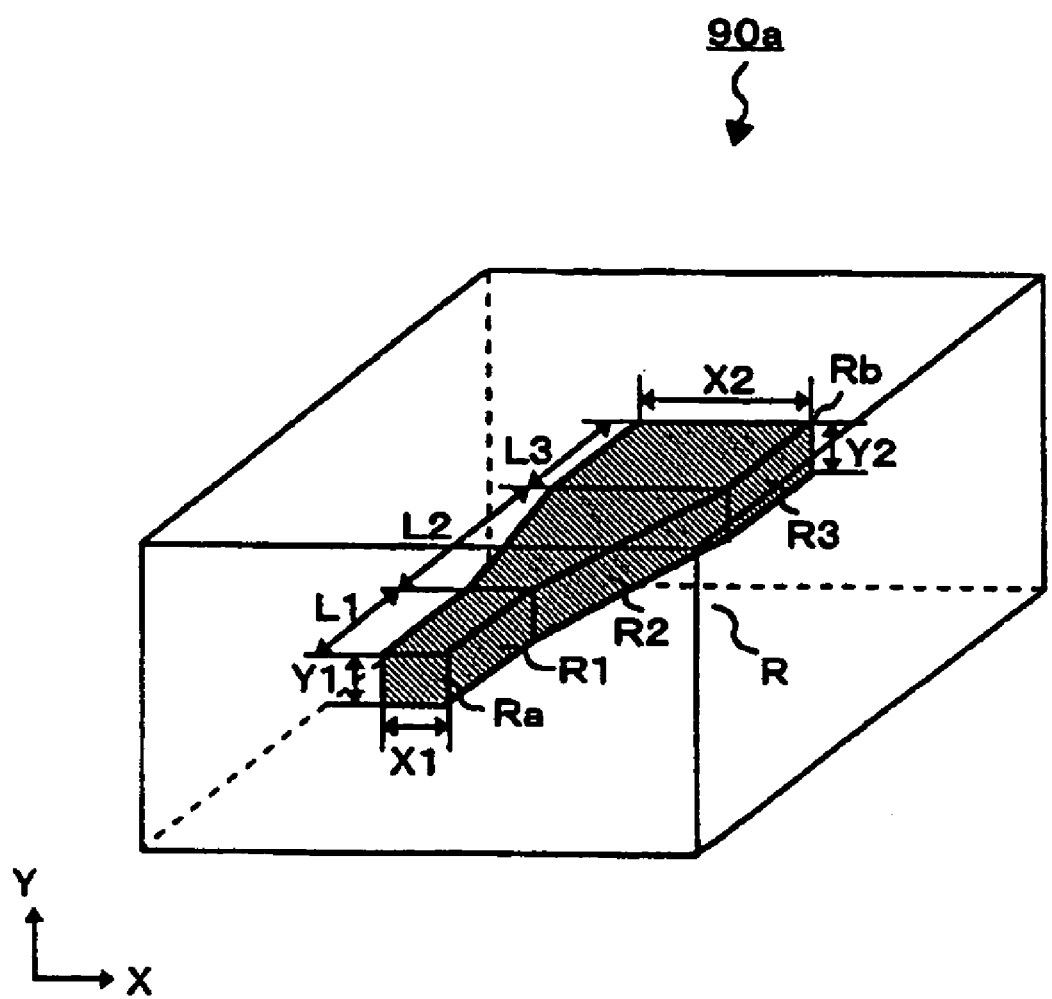
FIG. 11 is a view to explain the configuration and the operation of a spot size conversion element.

Here, the configuration and operation of the spot size conversion device 90a will be described by using FIG. 11. As shown in FIG. 11, the spot size conversion device 90a is a rectangular planer light wave circuit comprising a specific material, and in the interior thereof there are formed propagation areas R, which are different in refraction coefficient and specifically shaped. This propagation area R comprises an incidence end Ra to allow the signal light outputted from the semiconductor laser device 41a to enter and an emission end Rb to allow the signal light to emit toward the end face of the second optical fiber F2, and has a rectangular section, and has its size configured by three partial areas R1, R2, and R3 connected so as to expand as drawing near to the emission side.

In FIG. 11, the spot size conversion device 90a shows a size in the directions of X and Y, which are mutually orthogonal. Note that either of the X direction and Y direction is perpendicular to the optical axis of the signal light, and the X direction is a horizontal direction (direction perpendicular to the sheet face of the FIG) of the optical module 80 and the Y direction is perpendicular direction (direction horizontal to the sheet face of the FIG) of the optical module 80.

As shown in FIG. 11, from among the propagation areas R, the incidence end Ra is rectangular-shaped having a size of X1 and Y1, and the emission end Rb is rectangular-shaped having a size of X2 and Y2. Further, a partial area R1 of the incidence end Ra side is a rectangular section having a constant size X1 and Y1, and has a shape of a length L1, and a partial area R3 of the emission Rb side is a rectangular section having a constant size X2 and Y2, and has a shape of a length L3. On the other hand, a partial area R2 in between has a shape of a length L2 in which its rectangular section gradually expands from a size X1 and Y1 to a size X2 and Y2.

In general, the spot size of the optical signal in the semiconductor laser device 41b, comparing to the spot size of the optical signal in the end portion of the second optical fiber F2, is considerably smaller. Hence, the spot size conversion device 90a performs a conversion in such a manner as to gradually expand the spot size of the optical signal propagating the partial areas R1, R2, and R3 through the incidence end Ra, and convert the optical signal emitted from the emission end Rb so as to be adapted to the end portion of the second optical fiber F2. In this manner, a coupling loss caused by the difference of the spot size between the semiconductor laser device 41b and the second optical fiber F2 can be reduced.

Here, one example of a specific size condition of the propagation area R in the spot size conversion device 90a is shown in Table 1. In the size condition shown in Table 1, the propagation area R maintains the same size in the Y direction, and copes with a configuration where the size expands in the X direction. Usually, the spot size in the semiconductor laser device 41b, comparing to the second optical fiber F2, becomes smaller in the horizontal direction (X direction), and therefore, the spot size is configured to be mainly expanded in the X direction by the size condition shown in Table 1.

TABLE 1

| ITEM | SIZE |
| --- | --- |
| X1 | 4.5 μm |
| Y1 | 4.5 μm |
| L1 | 100 μm |
| L2 | 300 μm |
| L3 | 100 μm |
| X2 | 10 μm |
| Y2 | 4.5 μm |

Figure 12:
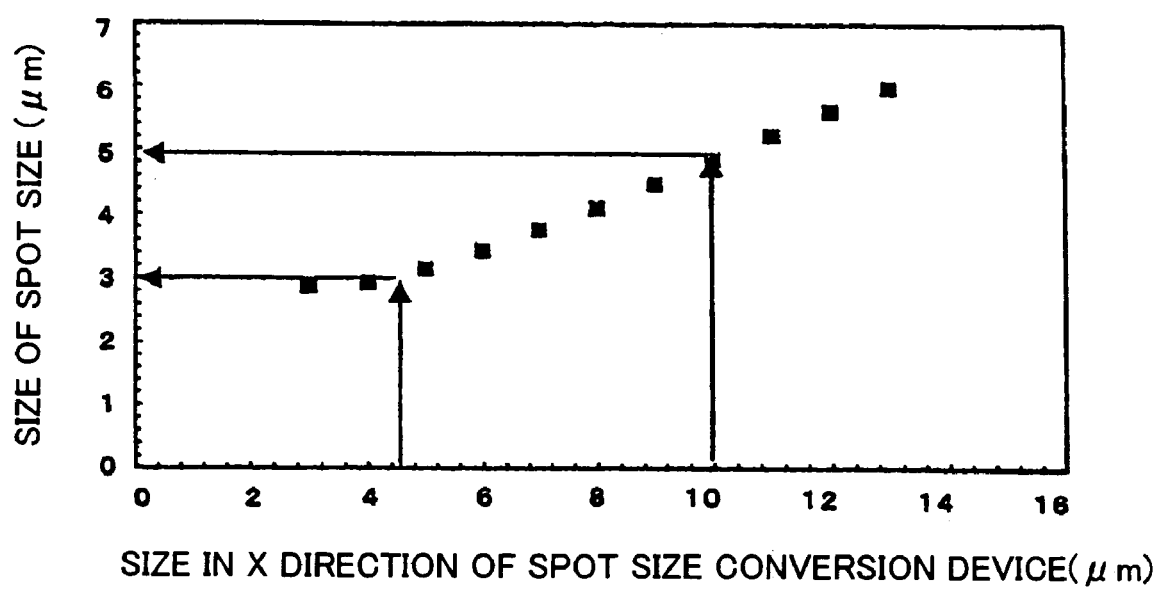
FIG. 12 is a view representing a relationship between a size of propagation area of the spot size conversion element adopting a size condition of Table 1 and a size of the spot size of the propagation light.

The characteristic of the optical module 80 in case the spot size conversion device 90a adopting the size condition shown in Table 1 is used will be described below by using FIGS. 12 to 14. FIG. 12 is a view representing a relationship between the size (X direction) of the propagation area R of the spot size conversion device 90a adopting the size condition of Table 1 and the size of the spot size of the propagation light. As shown in FIG. 12, it is understood that, as the propagation area R becomes large in the X direction, the spot size of the propagation light also uniformly becomes large.

Figure 13:
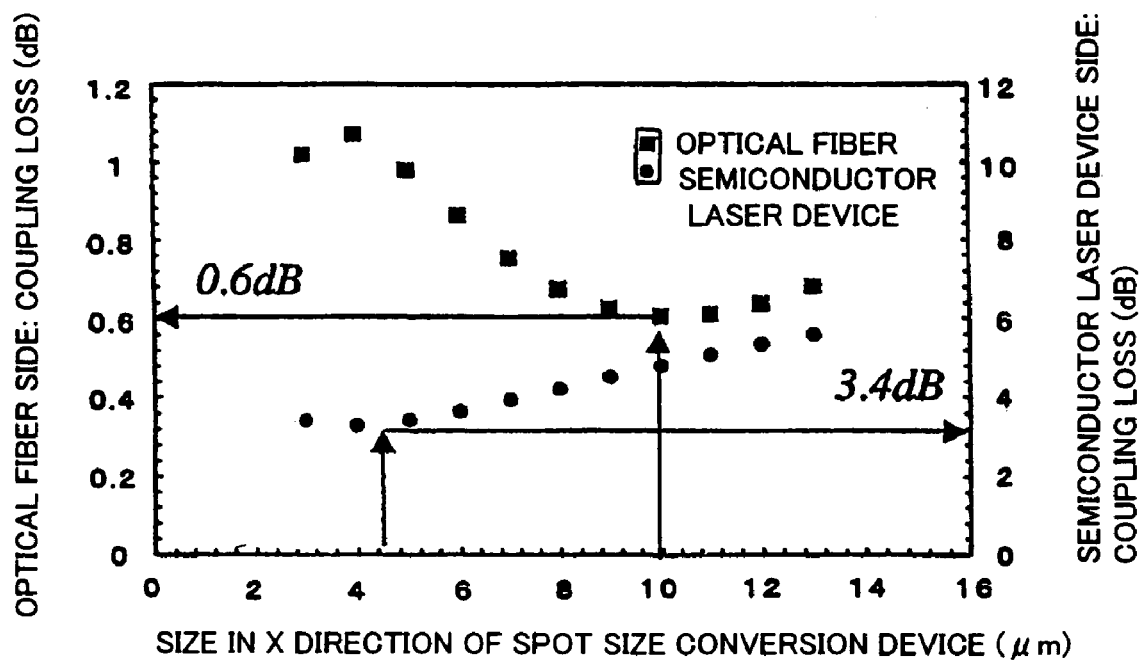
FIG. 13 is a view showing a relationship between each coupling loss and the size of the propagation area of the semiconductor laser and the second optical fiber.

FIG. 13 is a view representing a relationship between each coupling loss of the semiconductor laser device 41b and the second optical fiber F2 and the size of the propagation area R. In FIG. 13, the coupling loss at the time when the optical signal is coupled with the spot size conversion device 90a from the semiconductor laser device 41b and the coupling loss at the time when the optical signal is coupled with the second optical fiber F2 from the spot size conversion device 41b are shown, and a change is plotted in the case the width in each X direction of the incidence end Ra or the emission end Rb of the propagation area R is changed.

As shown in FIG. 13, at the side of the semiconductor laser device 41b, when the width in the X direction is approximately 4.5 μm, the minimum coupling loss 3.4 dB is obtained. Further, at the side of the second optical fiber F2, when the width in the X direction is approximately 10 μm, the minimum coupling loss 0.6 dB is obtained. Consequently, the size condition of Table 1 is optimized for the characteristic shown in FIG. 13, and a total coupling loss based on the result of FIG. 13 is calculated as 0.6 dB+3.4 dB=4.0 dB. In general, in the configuration where the semiconductor laser device 41b and the second optical fiber F2 are directly connected, since the coupling loss of approximately 9 to 10 dB is generated, it is confirmed that the coupling loss can be improved by 5 to 6 dB by the configuration interposing the spot size conversion device 90a.

Figure 14:
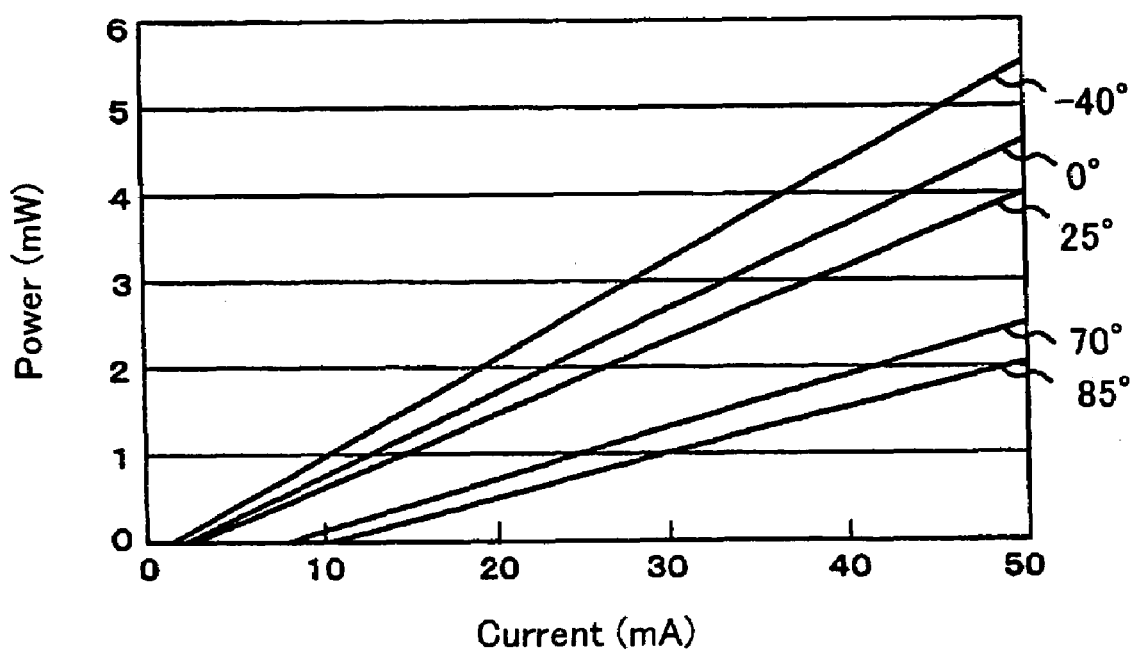
FIG. 14 is a view representing the temperature characteristic of an output power of the optical module configured by using the spot size conversion element.

FIG. 14 is a view representing the temperature characteristic of the output power of the optical module 80 (see FIG. 10), which is configured by using the spot size conversion device 90a. In FIG. 14, a change across the temperature range from −40 to 85 degrees is shown in relation to the output power of the optical module 80 for the driving current of the semiconductor laser 41b. In the fifth embodiment, as described above, since the coupling loss can be reduced by the spot size conversion device 90a, a sufficient output power can be secured. Note that as a result of similar experiments conducted with three optical modules 80 as a target, it is confirmed that the coupling loss by the spot size conversion device 90a remains approximately 4 dB (3.74 dB to 4.46 dB).

In the fifth embodiment as described above, since the spot size conversion device 90a is provided in the configuration, the coupling loss at the time when the signal light is supplied to the end face of the second optical fiber F2 from the semiconductor laser device 41a can be reduced, the output power of the optical module 80 can be sufficiently secured. In this case, there is no deed to use a spatial optical system configured by the lens and the like to convert the spot size and the semiconductor laser device having a spot size conversion function, but a simple configuration based on a general manufacturing technology such as the waveguide technology and the like is adopted, and therefore, a cost reduction can be attempted by a simple configuration.

Figure 15:
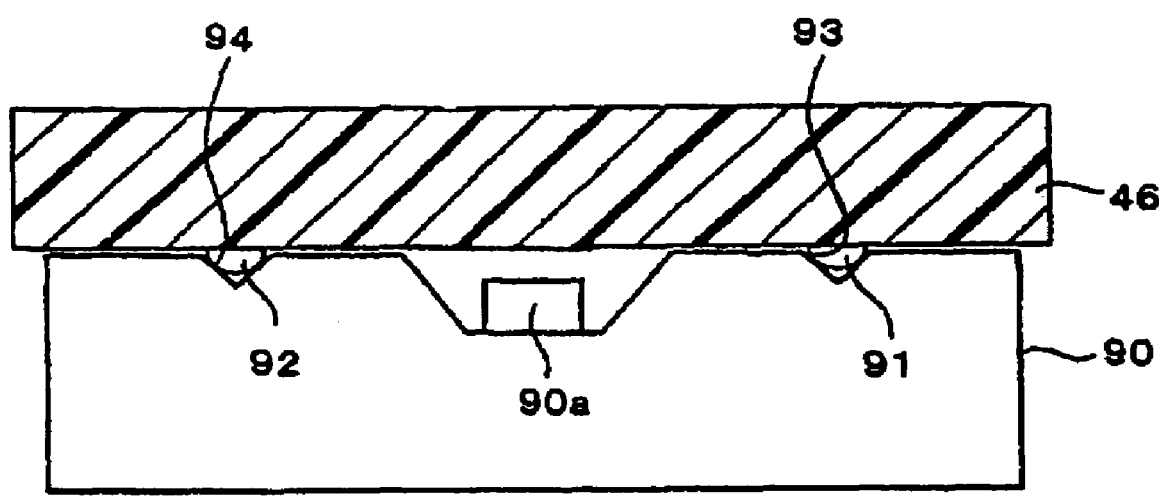
FIG. 15 is a sectional view to explain the positioning of the spot size conversion unit for the second holding member.

Next, FIG. 15 is a sectional view to explain the positioning of the spot size conversion portion 90 to the second holding member 46. The Si substrate of the spot size conversion portion 90 is formed with two V grooves 91 and 92 at both sides of the spot size conversion device 90a mounted in the center. On the other hand, the second holding member 46 is formed with two protrusions 93 and 94 at the positions corresponding to the V grooves 91 and 92. Hence, when the two V grooves 91 and 92 and the two protrusions 93 and 94 are engaged, by pressing the second holding member 46 onto the spot size conversion portion 90 by a constant pressure, both of them can be accurately positioned.

Note that, since the spot size conversion portion 90 and the laser light source portion 41 are configured by a separate substrate, by configuring the laser light source portion 41 similarly as FIG. 15, both portions can be independently positioned. In this manner, in a state in which the spot size conversion portion 90 and the laser light source portion 41 are positioned, respectively, a package 88 and a substrate 87 are sealed, thereby completing the optical module 80.

Next, a modified example of the optical module 80 according to the fifth embodiment will be described. This modified example corresponds to the configuration where the optical module 80 is turned into a module having a plurality of channels, similarly to the third embodiment.

Figure 16:
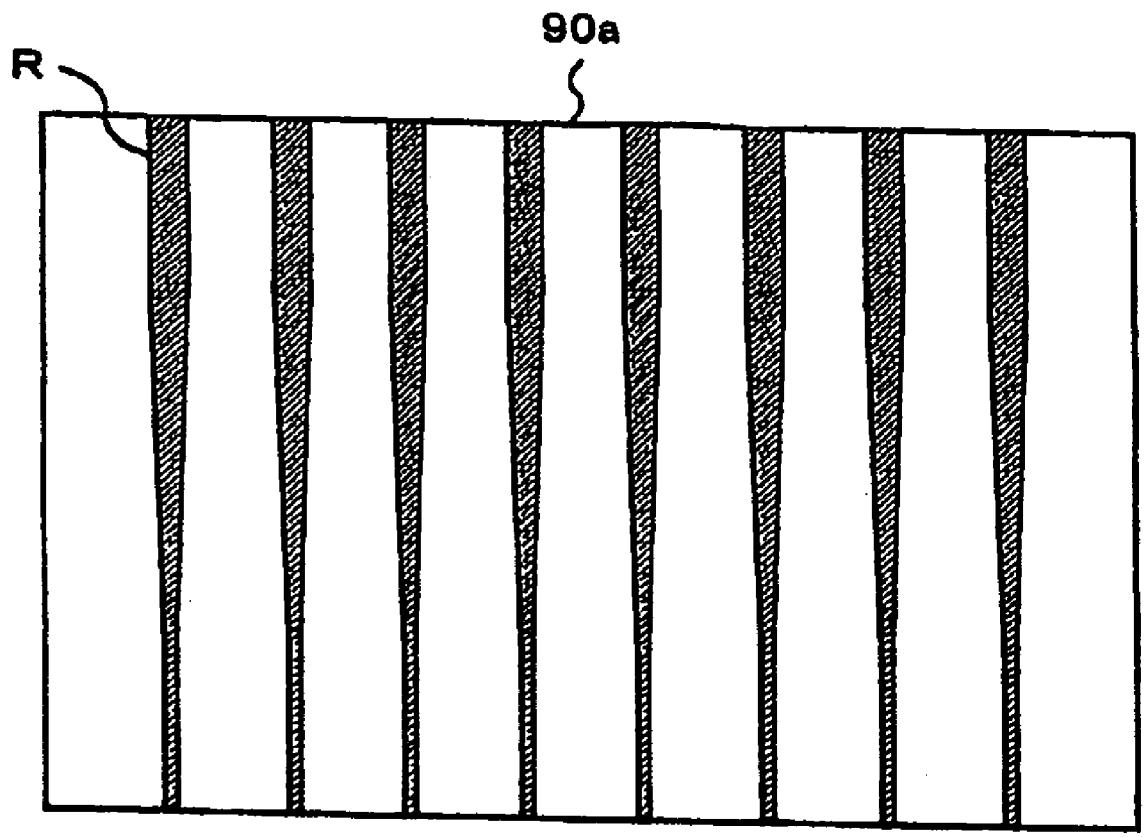
FIG. 16 is a top face view of the spot size conversion element in the modified example of a fifth embodiment.

FIG. 16 is an upper face view of the spot size conversion device 90a in the present modified example. In the spot size conversion device 90a shown in FIG. 16, eight pieces of the propagation areas R having the same shape are lined up in parallel, and each propagation area is configured such that the optical signal can be transmitted. In this case, if the semiconductor laser device 41b and the second optical fiber F2 are configured to be of the array type, and are disposed so as to be adapted to the position of each propagation area R of the spot size conversion device 90a, the optical module 80 having eight channels can be configured. Note that, in FIG. 16, while an example in which the intervals of eight pieces of the propagation areas R are equal is shown, the areas may be disposed at different intervals in parallel.

In the fifth embodiment as described above, while a description has been made on the case where the spot size conversion device 90a is formed by the planer light wave circuit, it is not limited to this, and the spot size conversion device 90a may be formed by the optical fiber. In this case, a square type refractive index distribution fiber GIF (graded-index fiber) or a TEC (thermally-diffused expanded core) fiber, which is a fiber having locally expanded a MFD (mode field diameter) of the optical fiber by a thermal diffusion technology, can be used.

Note that, in case the optical fiber is used for the spot size conversion device 90a, considering the optical coupling efficiency between the semiconductor laser device 41b and the second optical fiber F2, the length of the optical fiber is decided. That is, the length of the optical fiber is set to such a length that can be converted into the spot size where the output light from the semiconductor laser device 41b can be most efficiently coupled with the second optical fiber F2 (so that the insertion loss becomes the smallest). Further, the optical fiber used for the spot size conversion device 90a may be fused with a SMF and used. By utilizing the optical fiber and configuring the spot size conversion device 90a in this manner, it is possible to optically couple the semiconductor laser device 41b and the second optical fiber F2 at a low loss.

While the present invention has been described as above in line with the first to the fifth embodiments, it should be understood that the present invention is not limited to each of those embodiments. For example, in each of the embodiments, so long as the sectional shape of the fiber grooves 20, 45a, and 52b are approximately Ω-shaped, the size and the shape can be appropriately changed. However, when the sectional shape of the fiber grooves 20, 45a, and 52b becomes shallower than a half-circle in its strict sense of the word, the holding of the optical fiber becomes uncertain. Further, when the sectional face of the fiber grooves 20, 45a, and 52b becomes closer to a circle, the opening portion 23 functioning as a take-out widow is not allowed to have a sufficient size. To be specific, in case the diameter of the optical fiber fixed to the fiber grooves 20, 45a and 52b, that is, the outer diameter, for example, is 125 μm, the center of the circle (section circle) contacting the internal plane of the fiber grooves 20, 45a and 52b is allowed to be 10 to 60 μm in depth, so that, while securing a suitable holding of the optical fiber, the opening portion 23 of a sufficient size can be formed.

Further, in the second and third embodiments, by using the V grooves 42c, 42d, 54e, and 54f and the protrusions 45c, 45d, 52c, and 52d as alignment means, the alignments with the incidence and emission planes of the filter FL and the optical fiber and the photo diode and the laser diode are performed, but by using a pair of V grooves and the rod-shaped fiber nipped between these V grooves, these alignments can be also achieved.

Further, in each of the embodiments, while the end faces of the first optical fiber F1 and the like are formed with the filter FL comprising the dielectric multilayer film, the characteristic of this filter FL can be appropriately changed according to the purpose, and further, can be also replaced by the optical device (filter in the broad sense) such as a half mirror, a mirror, a FBG (Fiber Bragg Grating) and the like.

Further, in each of the embodiments, while a description has been made on the fiber built-up hold down member to align and fix the optical fiber, by the same principle, the optical waveguides of other types including the waveguide rod and the like can be also fixed.

INDUSTRIAL APPLICABILITY

As evident from the above described explanation, according to the optical component according to the present invention, only by inserting the optical waveguide along the holding plane extending along in a specific axial direction, a simple holding and alignment of the optical waveguide are made possible. Further, by utilizing the opening portion, while the separation of the optical waveguide positioned in the waveguide groove is prevented, a light can be introduced into the optical waveguide from the outside, and a necessary light can be taken out from the optical waveguide through the opening portion.

Further, by observing the opening portion when the optical waveguide is attached to the waveguide groove, the alignment of the optical waveguide end portion becomes relatively simple, thereby enhancing assembly accuracy.

What is claimed is:

1. An optical module including:
   an optical component having an upper and lower surface, including a waveguide holding groove located in the upper surface of the optical component; and
   an optical waveguide that is optically coupled with said optical component, the optical waveguide fixed to the optical component by a bond material that is arranged between an outer lateral surface of the waveguide and sidewalls of the waveguide holding groove,
   wherein said waveguide holding groove has substantially a circular cross-sectional shape, and the waveguide holding groove is located in the optical component in a way to form a groove opening on the upper surface of the optical component, the groove opening formed by an intersection of the sidewalls of the groove with the upper surface of the optical component,
   wherein a width of the groove opening on the upper surface of the optical component is narrower than a diameter of the optical waveguide located in said waveguide holding groove, and a diameter of the optical waveguide is narrower than a diameter of the circular cross-sectional shape of the waveguide holding groove.

2. The optical module according to claim 1, wherein the waveguide holding groove is located at a depth of the optical component such that an upper segment of the optical waveguide is located above the upper surface of the optical component.

3. The optical module according to claim 1, wherein said optical waveguide is provided with a filter having a specific characteristic, the filter located in the waveguide holding groove such that a portion of the filter is located outside of the waveguide holding groove through the groove opening.

4. The optical module according to claim 3, wherein said filter has a specific angle of inclination to the optical axis of a propagation light propagating through said optical waveguide.

5. The optical module according to claim 3, wherein said filter is provided on the end face of the optical waveguide inside the waveguide holding groove.

6. The optical module according to claim 1 or claim 5, wherein a plurality of said waveguides are provided.

7. The optical module according to claim 1, wherein said optical waveguide has at least a part of the outer lateral surface engaged with the sidewalls of the waveguide holding groove.

8. An optical module comprising the optical component according to claim 1, and further comprising:
   a light source portion configured to output a signal light guided by said optical component; and a spot size conversion portion configured to convert a spot size of the signal light outputted from said light source portion and couple the spot size light by a spot size adapted to the end portion of said optical waveguide of said optical component.

9. The optical module according to claim 1, wherein said optical component further comprises:
   an alignment mechanism configured to align the optical component.

10. The optical module according to claim 8, wherein said spot size conversion portion is formed by a planer light wave circuit mounted on a substrate.

11. The optical module according to claim 10, wherein the substrate where said spot size conversion portion is formed and the substrate where said light source portion is formed are configured by separate entities, and are configured to be independently positioned.

12. The optical module according to claim 11, wherein the substrate formed with said spot size and the substrate formed with said light source portion are formed with V grooves, respectively, and a holding member configured to hold said optical component is formed with a protrusion, and by engaging said each V groove with said protrusion, the positioning is made possible.

13. The optical module according to claim 1, wherein from a cross-sectional view the sidewalls of the waveguide holding groove are substantially co-centrical with the lateral outer surface of the optical waveguide.

* * * * *